United States Patent [19]
Mikami

[11] 3,728,010
[45] Apr. 17, 1973

[54] VARIABLE-MAGNIFYING-POWER SYMMETRICAL LENS SYSTEM

[75] Inventor: Nobunao Mikami, Yokohama, Japan

[73] Assignee: Ricoh Co., Ltd., Tokyo, Japan

[22] Filed: Sept. 4, 1970

[21] Appl. No.: 69,814

[30] Foreign Application Priority Data

Sept. 8, 1969   Japan..............................44/70570

[52] U.S. Cl...................350/184, 350/187, 350/202, 350/214, 350/255, 355/58
[51] Int. Cl.............................................G02b 15/16
[58] Field of Search.....................350/184, 187, 214, 350/255; 355/58

[56] References Cited

UNITED STATES PATENTS

| | | | |
|---|---|---|---|
| 3,127,466 | 3/1964 | Walters | 350/184 |
| 2,481,639 | 9/1949 | Altman et al. | 350/214 |
| 3,552,832 | 1/1971 | Demaine | 350/184 X |
| 2,356,620 | 8/1944 | Schade | 350/184 X |

FOREIGN PATENTS OR APPLICATIONS

| | | | |
|---|---|---|---|
| 1,173,962 | 12/1969 | Great Britain | 350/184 |
| 471,370 | 5/1969 | Switzerland | 350/212 |

*Primary Examiner*—John K. Corbin
*Attorney*—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

The invention provides a lens system especially adapted for use with photocopying machines, phototypesetters, etc. whose magnifying power may be varied continuously within a range near the unity magnification for example between 0.7 and 1.4. The lens system comprises lenses and lens groups symmetrically arranged with respect to a center stop in such a manner that the outermost lenses (the front and rear lenses) and/or the lens next to the outermost lenses may be shifted toward and away from the stop while maintaining said symmetrical relation. In an embodiment, the magnification is unity when the overall length of the lens system is the longest while the magnification is greater or smaller than unit when the overall length is shorter than the longest one. Aberrations including chromatic aberration are well corrected.

9 Claims, 23 Drawing Figures

SPHERICAL ABERRATION 0.7 TIMES

ASTIGMATISM

SPHERICAL ABERRATION 0.8 TIMES

ASTIGMATISM 0.9 TIMES
SPHERICAL ABERRATION

ASTIGMATISM 1.0 TIMES
SPHERICAL ABERRATION

ASTIGMATISM

SPHERICAL ABERRATION 1.1 TIMES

ASTIGMATISM

SPHERICAL ABERRATION 1.2 TIMES

ASTIGMATISM

SPHERICAL ABERRATION 1.3 TIMES

ASTIGMATISM

SPHERICAL ABERRATION 1.4 TIMES

ASTIGMATISM 3,728,010

VARIABLE-MAGNIFYING-POWER SYMMETRICAL LENS SYSTEM

BACKGROUND OF THE INVENTION

The present invention relates to generally a lens and more particularly a lens system whose magnifying power may be continuously varied in a range near the unity magnification and which is adapted to be used as the copying lens with photocopying machines, phototypesetters, etc.

In general, the magnification used in the photocopying machines, phototypesetters and the like is nearly unity and slightly larger or smaller than unity depending upon requirements. For example, when an original of size A-3 in Japan (297 × 420 mm) is copied upon a photosensitized paper of A-4 in Japan (210 × 297 mm), the magnification or reduction is about 0.7. When an original is copied on a photosensitive paper having the same size as that of the original, the magnification is unity, but the magnification must be varied slightly when an effective area or the area to be copied of the original is smaller than its size because of the perforations formed for filing.

For this purpose, there have been employed various methods. For example, in a large phototypesetter, the magnification may be varied by varying the distance between an original to be copied and a photosensitive medium. However, a complex mechanism is required in order to displace the original and/or photosensitized medium plane at a right angle relative to the optical axis with a higher degree of precision, thus resulting in high cost. Some photocopying machines employ a few objectives having different focal lengths and mounted upon a revolving nosepiece or turret, but the magnifying power may be only varied in steps. That is, the magnification cannot be varied continuously to a desired one. Furthermore, the lenses must be mounted with a higher degree of accuracy and the operation is rather complex.

There has been proposed a lens system for photocopying machines in order to vary its magnifying power within a very limited range near unity between about 0.95 and 1.05 by utilizing the depth of focus of the lens system. One distinctive defect is, however, that the magnifying power may be varied only in a very limited small range.

There have been used in practice relatively simple photocopying machines in which one or two reflecting mirrors are moved in the optical path while an original and photosensitive medium planes are held stationary. In the photocopying machines employing only one reflecting mirror, the center of the original or photosensitive medium plane is displaced and it is very difficult to move the large-sized reflecting mirror with a higher degree of accuracy. In the photocopying machines employing two reflecting mirrors, when the angle of view becomes greater than 40°, they cannot be used in practice.

SUMMARY OF THE INVENTION

It is therefore the primary object of the present invention to provide an improved lens system whose magnifying power may be continuously varied within a range near unity magnification.

It is another object of the present invention to provide a copying lens system whose magnifying power may be continuously varied within a range near the unity magnification by shifting its lens elements symmetrically with respect to a center stop and which is best suited for use with a photocopying machine of the character in which both of an original and photosensitive medium plane are held stationary.

It is a further object of the present invention to provide a lens system of the character described above whose optical aberrations are well corrected so that an object may be sharply imaged with the minimum distortion.

In brief, the present invention provides a lens system comprising a plurality of meniscus lenses and groups arranged with symmetrical relation with respect to a center stop in such a manner that the outermost lenses and/or the lenses next to the outermost lenses may be shifted toward and away from the center stop while maintaining the symmetrical relation with respect to the center stop, whereby the magnifying power may be varied continuously within a range near the unity magnification for example between 0.7 and 1.4.

The present invention will become more apparent from the following description of two preferred embodiments thereof taken in conjunction with the accompanying drawings.

Figure 1:
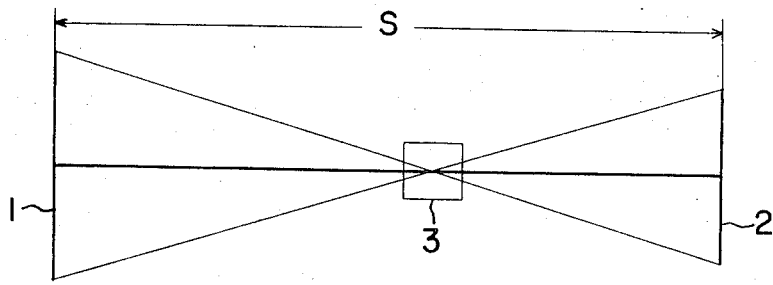
FIG. 1 is a diagrammatic view for explanation of the principle of the present invention.

First the underlying principle of the present invention will be discussed with reference to FIG. 1. When a distance between an original 1 and an image plane 2 is $S$, the focal length $f_M$ of a focussing lens 3 for given magnification $M$ may be given by the following expression:

$$f_M = [M/(1+M)^2]S \qquad (1)$$

(The aberrations and the length of principal points of the focussing lens 3 are not taken into consideration.) The increment or decrement of the focal length $\Delta f_M$ is given by the following equation when the magnification is varied from unity to $1/\sqrt{2}$: $\Delta f_M = \frac{1}{4} S - [M/(1+M)^2]S \approx 0.007\ S \approx 0.03 f_1 \qquad (2)$ From Eq. (2) it will be seen that when the focal length $f_1$ for unity magnification is reduced by about 3 percent, the magnification M becomes $1/\sqrt{2} \approx 0.7$ or $\sqrt{2} \approx 1.4$.

It would be considered simple to design a zoom lens, that is variable magnifying power lens, satisfying the above condition because the variation is focal length $f_M$ is exceedingly smaller than that of a zoom lens for cameras, but it is not true for a copying lens because a desired resolving power must be maintained all over the image plane at any magnification with the least distortion and a sufficient aperture efficiency in order to illuminate the image plane uniformly. Thus, the design is extremely difficult.

In the copying lens in accordance with the present invention, lens elements are arranged symmetrically with respect to a center or stop so that the distortion which is the most difficult aberration to be corrected in a variable-magnifying-power lens may be perfectly corrected. Because of the symmetrical lens system, the coma and color magnification aberration may also be satisfactorily well corrected while the spherical aberration, the astigmatism and on-axis-chromatic aberration may be also corrected to the maximum. The resolving power higher than 8 lines/mm may be obtained all over the image plane in the magnification range from about 0.7 to 1.4.

Figure 2:
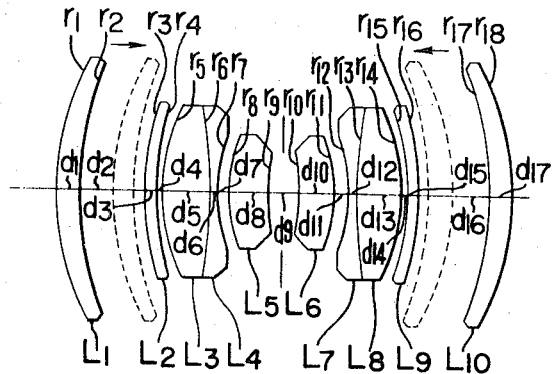
FIG. 2 is a diagrammatic view of the first embodiment of the present invention.

FIG. 2 depicts one embodiment of a variable-magnifying-power lens in accordance with the present invention consisting of eight groups and 10 elements arranged symmetrically with respect to a stop. It is seen that all of the lens groups are meniscus lenses whose concave surfaces are all directed toward the stop. The first lens $L_1$ is a positive lens; the second lens $L_2$, a negative lens; the third lens $L_3$ and fourth lens $L_4$ are cemented; and the fifth lens $L_5$, a positive lens. The sixth, seventh, eighth, ninth and tenth lenses $L_6$, $L_7$, $L_8$, $L_9$ and $L_{10}$ and the fifth to first lenses are symmetrical with respect to the stop respectively. The focal lengths of the first positive lens $L_1$ and tenth positive lens $L_{10}$ is between two and five times the compound focal length of the lens system and these lenses $L_1$ and $L_{10}$ have the configuration such as meniscus lens whose concave surface is directed toward the stop so that the change of aberrations caused upon the displacement of these lenses $L_1$ and $L_{10}$ may be minimized. It should be noted that these lenses $L_1$ and $L_{10}$ remain symmetrical with respect to the stop when they are displaced. The lens system comprising the lenses $L_3 - L_8$ is known in the art as the Orthometar lens. The design data are given below where $r_n$ = radius of curvature of lens;
$d_n$ = thicknesses of the lenses and the air gaps between them along the optical axis.
$N_n$ = index of refraction of the lens elements when d-line of helium is used; and
$V_n$ = Abbe numbers of the lens elements when d-line of helium is used.
($n$ being numbered from front to rear)

The maximum aperture ratio = 1 : 8
Focal length = 248 mm – 258 mm
Magnification = 0.7 – 1.4

$r_1 = 78.65$    $d_1 = 6.58$        $N_1 = 1.53996$    $V_1 = 59.7$
$r_2 = 101.29$   $d_2 = 4.8 - 21.4$
$r_3 = 96.68$    $d_3 = 3.29$        $N_2 = 1.53172$    $V_2 = 48.9$
$r_4 = 64.89$    $d_4 = 1.48$
$r_5 = 56.40$    $d_5 = 12.77$       $N_3 = 1.67790$    $V_3 = 55.5$
$r_6 = -150.04$  $d_6 = 2.38$        $N_4 = 1.62374$    $V_4 = 47.0$
$r_7 = 44.58$    $d_7 = 4.19$
$r_8 = 59.50$    $d_8 = 10.43$       $N_5 = 1.58900$    $V_5 = 48.6$
$r_9 = 95.76$    $d_9 = 8.43$
$r_{10} = -95.76$ $d_{10} = 10.43$   $N_6 = 1.58900$    $V_6 = 48.6$
$r_{11} = -59.50$ $d_{11} = 4.19$
$r_{12} = -44.58$ $d_{12} = 2.38$    $N_7 = 1.62374$    $V_7 = 47.0$
$r_{13} = 150.04$ $d_{13} = 12.77$   $N_8 = 1.67790$    $V_8 = 55.5$
$r_{14} = -56.40$ $d_{14} = 1.48$
$r_{15} = -64.89$ $d_{15} = 3.29$    $N_9 = 1.53172$    $V_9 = 48.9$
$r_{16} = -96.68$ $d_{16} = 4.8 - 21.4$
$r_{17} = -101.29$ $d_{17} = 6.58$   $N_{10} = 1.53996$ $V_{10} = 59.7$
$r_{18} = -78.65$

| Magnification | 0.7 | 0.8 | 0.9 | 1.0 | 1.1 | 1.2 | 1.3 | 1.4 |
|---|---|---|---|---|---|---|---|---|
| $d_2 = d_{16}$ | 4.8 | 14.0 | 19.7 | 21.4 | 19.9 | 16.5 | 11.8 | 6.3 |
| focal length | 248.3 | 253.6 | 257.0 | 258.1 | 257.1 | 255.1 | 252.3 | 249.1 |
| distance in object space | 553.8 | 512.6 | 476.5 | 447.4 | 423.9 | 404.8 | 389.4 | 377.4 |
| distance in image space | 374.2 | 397.0 | 421.7 | 447.4 | 474.0 | 502.8 | 524.6 | 547.6 |
| total length of lens system | 100.3 | 118.7 | 130.1 | 133.5 | 130.4 | 123.7 | 114.3 | 103.3 |

Figure 3:
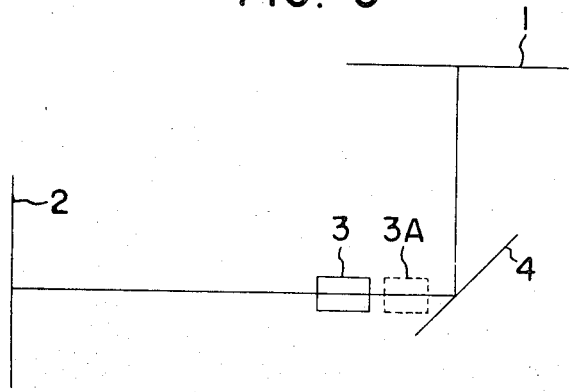
FIG. 3 is a diagrammatic view of the optical system of a photocopying machine employing a variable-magnifying-power lens system in accordance with the present invention.
Figure 4A:
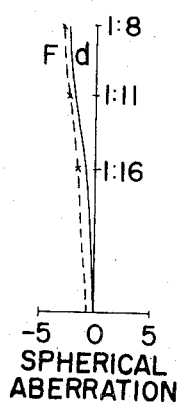
FIGS. 4-A and -B through FIGS. 11-A and -B depict the spherical aberration and astigmatism curves of the lens system illustrated in FIG. 2 when its magnifying power is varied from 0.7 to 1.4.
Figure 4B:
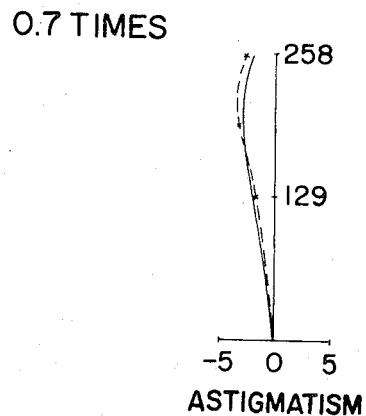
Figure 5A:
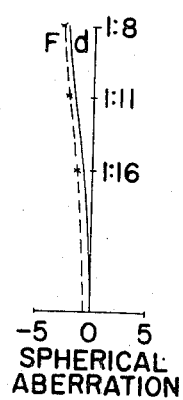
Figure 5B:
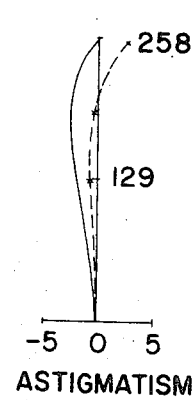
Figure 6A:
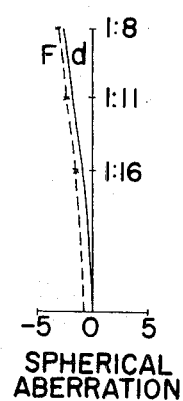
Figure 6B:
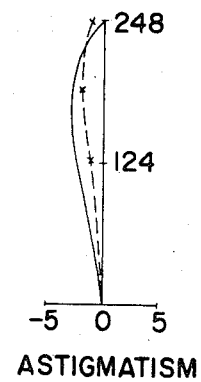
Figure 7A:
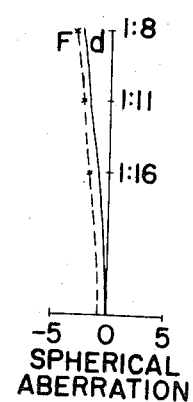
Figure 7B:
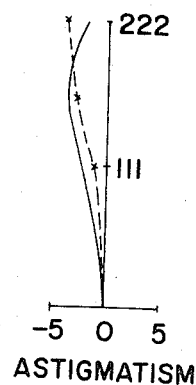
Figure 8A:
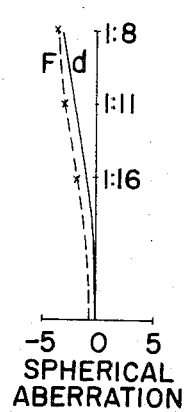
Figure 8B:
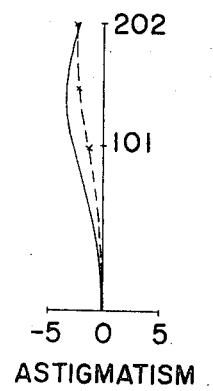
Figure 9A:
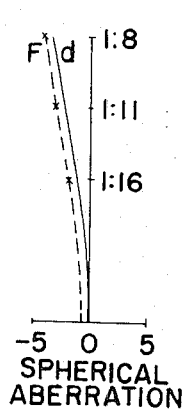
Figure 9B:
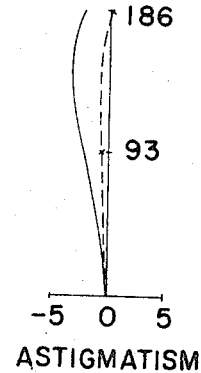
Figure 10A:
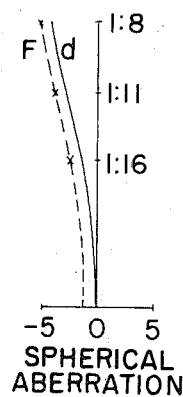
Figure 10B:
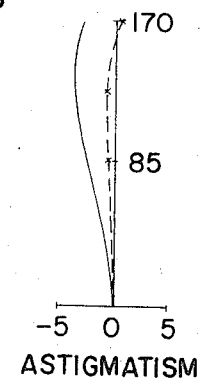
Figure 11A:
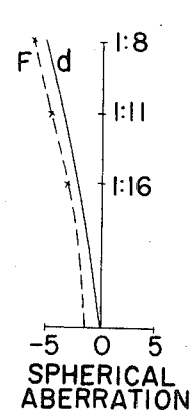
Figure 11B:
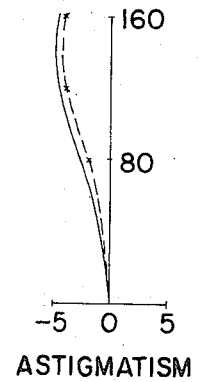

The distance in object space is that between the first surface of the first lens $L_1$ and the original 1 while the distance in image space is that between the 18th surface of the 10th lens and the image plane 2 along the optical axis of the system. For all magnifications, the distance between the original 1 and the image plane 2 was maintained 1028.3 mm (See FIG. 3). FIGS. 4–A and –B through FIGS. 11–A and –B inclusive depict the spherical aberration and astigmatism curves for given magnification respectively. The aperture ratio is plotted as the ordinate in the spherical aberration curves while the height from the center of the original is plotted as the ordinate in the astigmatism curves. It was confirmed that the distortion was all within 0.1 percent for all magnification.

The coefficients of the spherical aberration I, coma II, astigmatism III, curvature of field IV and distortion V for given magnification are given below:

Magnification = 0.7, $d_2 = d_{16} = 4.8$

| | I | II | III | IV | V |
|---|---|---|---|---|---|
| 1 | 45.58 | 3.27 | 0.23 | 1.88 | 0.15 |
| 2 | −11.84 | −2.15 | −0.39 | −1.46 | −0.33 |
| 3 | 13.54 | 2.47 | 0.45 | 1.51 | 0.35 |
| 4 | −81.29 | −6.16 | −0.46 | −2.26 | −0.20 |
| 5 | 124.86 | 7.58 | 0.46 | 3.03 | 0.21 |
| 6 | 6.14 | −1.34 | 0.29 | 0.05 | −0.07 |
| 7 | −173.99 | −14.19 | −1.15 | −3.64 | −0.39 |
| 8 | 90.50 | 11.65 | 1.50 | 2.63 | 0.53 |
| 9 | −6.33 | −2.27 | −0.81 | −1.63 | −0.88 |
| 10 | −10.09 | 3.28 | −1.06 | −1.63 | 0.87 |
| 11 | 104.99 | −13.02 | 1.61 | 2.63 | −0.52 |
| 12 | −192.14 | 15.30 | −1.21 | −3.64 | 0.38 |
| 13 | 4.84 | 1.13 | 0.26 | 0.05 | 0.07 |
| 14 | 134.79 | −8.04 | 0.47 | 3.03 | −0.20 |
| 15 | −88.82 | 6.59 | −0.48 | −2.26 | 0.20 |
| 16 | 17.17 | −2.97 | 0.51 | 1.51 | −0.35 |
| 17 | −15.02 | 2.59 | −0.44 | −1.46 | 0.33 |
| 18 | 49.76 | −3.50 | 0.24 | 1.88 | −0.15 |
| Σ | 12.67 | 0.21 | 0.01 | 0.23 | −0.00 |

Magnification = 0.8, $d_2 = d_{16}$ 14.0

| | I | II | III | IV | V |
|---|---|---|---|---|---|
| 1 | 53.64 | 2.34 | 0.10 | 2.03 | 0.09 |
| 2 | −14.33 | −2.13 | −0.31 | −1.58 | −0.28 |
| 3 | 16.58 | 2.87 | 0.49 | 1.63 | 0.37 |
| 4 | −96.74 | −7.01 | −0.50 | −2.44 | −0.21 |
| 5 | 148.26 | 8.61 | 0.50 | 3.27 | 0.21 |
| 6 | 6.90 | −1.47 | 0.31 | 0.06 | −0.07 |
| 7 | −207.44 | −16.17 | −1.26 | −3.93 | −0.40 |
| 8 | 108.86 | 13.36 | 1.64 | 2.84 | 0.55 |
| 9 | −8.10 | −2.74 | −0.92 | −1.76 | −0.91 |
| 10 | −10.96 | 3.47 | −1.10 | −1.76 | 0.91 |
| 11 | 119.89 | −14.37 | 1.72 | 2.84 | −0.54 |
| 12 | −221.25 | 16.98 | −1.30 | −3.93 | 0.40 |
| 13 | 5.92 | 1.31 | 0.29 | 0.06 | 0.07 |
| 14 | 155.82 | −8.94 | 0.51 | 3.27 | −0.21 |

|    | I       | II    | III   | IV    | V     |
|----|---------|-------|-------|-------|-------|
| 15 | −102.47 | 7.32  | −0.52 | −2.44 | 0.21  |
| 16 | 19.34   | −3.24 | 0.54  | 1.63  | −0.36 |
| 17 | −16.41  | 2.36  | −0.34 | −1.58 | 0.27  |
| 18 | 55.68   | −2.41 | −0.10 | 2.03  | −0.09 |
| Σ  | 13.21   | 0.16  | −0.05 | 0.25  | −0.00 |

Magnification = 0.9, $d_2 = d_{16} = 19.7$

|    | I       | II     | III   | IV    | V     |
|----|---------|--------|-------|-------|-------|
| 1  | 63.14   | 1.69   | 0.04  | 2.18  | 0.05  |
| 2  | −17.34  | −2.19  | −0.27 | −1.69 | −0.24 |
| 3  | 20.36   | 3.34   | 0.54  | 1.75  | 0.37  |
| 4  | −115.66 | −7.97  | −0.54 | −2.61 | −0.21 |
| 5  | 176.89  | 9.77   | 0.53  | 3.50  | 0.22  |
| 6  | 7.80    | −1.60  | 0.33  | 0.06  | −0.08 |
| 7  | −248.48 | −18.40 | −1.36 | −1.21 | −0.41 |
| 8  | 131.55  | 15.31  | 1.78  | 3.04  | 0.56  |
| 9  | −10.38  | −3.29  | −1.04 | −1.89 | −0.93 |
| 10 | −11.94  | 3.67   | −1.13 | −1.89 | 0.93  |
| 11 | 137.57  | −15.83 | −1.82 | 3.04  | −0.56 |
| 12 | −256.02 | 18.82  | −1.38 | −4.21 | 0.41  |
| 13 | 7.27    | 1.52   | 0.32  | 0.06  | 0.08  |
| 14 | 181.03  | −9.94  | 0.54  | 3.50  | −0.22 |
| 15 | −118.80 | 8.13   | −0.55 | −2.61 | 0.21  |
| 16 | 21.87   | −3.53  | 0.57  | 1.75  | −0.37 |
| 17 | −18.37  | 2.29   | −0.28 | −1.69 | 0.24  |
| 18 | 63.88   | −1.71  | 0.04  | 2.18  | −0.05 |
| Σ  | 14.37   | 0.08   | −0.04 | 0.27  | −0.00 |

Magnification = unity, $d_2 = d_{16} = 21.4$

|    | I       | II     | III   | IV    | V     |
|----|---------|--------|-------|-------|-------|
| 1  | 73.37   | 1.56   | 0.03  | 2.30  | 0.04  |
| 2  | −20.63  | −2.38  | −0.27 | −1.78 | −0.23 |
| 3  | 24.48   | 3.80   | 0.59  | 1.85  | 0.37  |
| 4  | −135.96 | −8.90  | −0.58 | −2.76 | −0.21 |
| 5  | 207.55  | 10.90  | 0.57  | 3.69  | 0.22  |
| 6  | 8.74    | −1.73  | 0.34  | 0.06  | −0.08 |
| 7  | −292.54 | −20.59 | −1.44 | −4.44 | −0.41 |
| 8  | 156.03  | 17.22  | 1.90  | 3.21  | 0.56  |
| 9  | −12.92  | −3.85  | −1.14 | −1.99 | −0.93 |
| 10 | −12.93  | 3.85   | −1.14 | −1.99 | 0.93  |
| 11 | 156.05  | −17.22 | 1.90  | 3.21  | −0.56 |
| 12 | −292.55 | 20.59  | −1.44 | −4.44 | 0.41  |
| 13 | 8.74    | 1.73   | 0.34  | 0.06  | 0.08  |
| 14 | 207.56  | −10.90 | 0.57  | 3.69  | −0.22 |
| 15 | −135.96 | 8.90   | −0.58 | −2.76 | 0.21  |
| 16 | 24.49   | −3.60  | 0.59  | 1.85  | −0.37 |
| 17 | −20.63  | 2.38   | −0.27 | −1.78 | 0.23  |
| 18 | 73.37   | −1.56  | 0.03  | 2.30  | −0.04 |
| Σ  | 16.26   | −0.00  | −0.03 | −0.28 | 0.00  |

Magnification = 1.1, $d_2 = d_{16} = 19.9$

|    | I       | II     | III   | IV    | V     |
|----|---------|--------|-------|-------|-------|
| 1  | 86.73   | 2.06   | 0.04  | 2.41  | 0.05  |
| 2  | −24.94  | −2.80  | −0.31 | −1.87 | −0.24 |
| 3  | 29.71   | 4.33   | 0.63  | 1.94  | 0.37  |
| 4  | −161.37 | −9.97  | −0.61 | −2.87 | −0.21 |
| 5  | 245.90  | 12.20  | 0.60  | 3.88  | 0.22  |
| 6  | 9.87    | −1.87  | 0.35  | 0.07  | −0.08 |
| 7  | −347.78 | −23.09 | −1.53 | −4.66 | −0.41 |
| 8  | 186.87  | 19.42  | 2.01  | 3.37  | 0.56  |
| 9  | −16.22  | −4.51  | −1.25 | −2.09 | −0.93 |
| 10 | −14.10  | 4.04   | −1.15 | −2.09 | 0.93  |
| 11 | 178.71  | −18.78 | 1.97  | 3.37  | −0.56 |
| 12 | −337.55 | 22.57  | −1.51 | −4.66 | 0.41  |
| 13 | 10.60   | 1.97   | 0.36  | 0.07  | 0.08  |
| 14 | 240.31  | −11.99 | 0.59  | 3.88  | −0.22 |
| 15 | −157.13 | 9.78   | −0.60 | −2.89 | 0.21  |
| 16 | 27.66   | −4.09  | 0.60  | 1.94  | −0.37 |
| 17 | −23.55  | 2.67   | −0.30 | −1.87 | 0.24  |
| 18 | 85.75   | −2.04  | 0.04  | 2.41  | −0.05 |
| Σ  | 19.47   | −0.10  | −0.04 | 0.29  | 0.00  |

Magnification = 1.2, $d_2 = d_{16} = 16.5$

|    | I       | II     | III   | IV    | V     |
|----|---------|--------|-------|-------|-------|
| 1  | 101.82  | 3.05   | 0.09  | 2.51  | 0.07  |
| 2  | −29.83  | −3.37  | −0.38 | −1.95 | −0.26 |
| 3  | 35.37   | 4.86   | 0.66  | 2.02  | 0.37  |
| 4  | −188.63 | −11.03 | −0.64 | −3.01 | −0.21 |
| 5  | 286.99  | 13.48  | 0.63  | 4.03  | 0.21  |
| 6  | 11.06   | 2.00   | 0.36  | 0.07  | −0.07 |
| 7  | −407.08 | −25.57 | −1.60 | −4.85 | −0.40 |
| 8  | 220.11  | 21.60  | 2.12  | 3.51  | 0.55  |
| 9  | −19.86  | −5.17  | −1.34 | −2.18 | −0.91 |
| 10 | −15.31  | 4.21   | −1.16 | −2.18 | 0.92  |
| 11 | 202.58  | −20.30 | 2.03  | 3.51  | −0.55 |
| 12 | −385.13 | 24.51  | −1.56 | −4.85 | 0.40  |
| 13 | 12.63   | 2.20   | 0.38  | 0.07  | 0.08  |
| 14 | 274.98  | −13.04 | 0.61  | 4.03  | −0.22 |
| 15 | −179.51 | 10.63  | −0.62 | −3.01 | 0.21  |
| 16 | 30.98   | −4.38  | 0.62  | 2.02  | −0.37 |
| 17 | −26.66  | 3.08   | −0.35 | −1.95 | 0.26  |
| 18 | 99.06   | 312.99 | 0.09  | 2.51  | −0.07 |
| Σ  | 23.59   | −0.21  | −0.06 | 0.31  | 0.00  |

Magnification = 1.3, $d_2 = d_{16} = 11.8$

|    | I       | II     | III   | IV    | V     |
|----|---------|--------|-------|-------|-------|
| 1  | 119.45  | 4.56   | 0.17  | 2.60  | 0.10  |
| 2  | −35.56  | −4.12  | −0.47 | −2.01 | −0.28 |
| 3  | 41.65   | 5.40   | 0.70  | 2.09  | 0.36  |
| 4  | −218.57 | −12.11 | −0.67 | −3.12 | −0.21 |
| 5  | 332.11  | 14.78  | 0.65  | 4.17  | 0.21  |
| 6  | 12.35   | −2.14  | 0.37  | 0.07  | −0.07 |
| 7  | −472.29 | −28.09 | −1.67 | −5.02 | −0.39 |
| 8  | 256.77  | 23.83  | 2.21  | 3.63  | 0.54  |
| 9  | −23.95  | −5.85  | −1.43 | −2.25 | −0.90 |
| 10 | −16.60  | 4.39   | −1.16 | −2.25 | 0.90  |
| 11 | 228.44  | −21.83 | 2.08  | 3.63  | −0.54 |
| 12 | −436.82 | 26.47  | −1.60 | −5.02 | 0.40  |
| 13 | 14.88   | 2.45   | 0.40  | 0.07  | 0.07  |
| 14 | 312.70  | −14.11 | 0.63  | 4.178 | −0.21 |
| 15 | −203.85 | 11.49  | −0.64 | −3.12 | 0.21  |
| 16 | 34.56   | −4.67  | 0.63  | 2.09  | −0.36 |
| 17 | −30.00  | 3.60   | −0.43 | −2.01 | 0.29  |
| 18 | 113.52  | −4.38  | 0.16  | 2.60  | −0.10 |
| Σ  | 28.81   | 0.33   | −0.05 | 0.32  | 0.00  |

Magnification = 1.4, $d_2 = d_{16} = 6.3$

|    | I       | II     | III   | IV    | V     |
|----|---------|--------|-------|-------|-------|
| 1  | 139.51  | 6.56   | 0.30  | 2.67  | 0.14  |
| 2  | −42.07  | −5.04  | −0.60 | −2.07 | −0.32 |
| 3  | 48.38   | 5.94   | 0.73  | 2.15  | 0.35  |
| 4  | −250.45 | −13.17 | −0.69 | −3.21 | −0.20 |
| 5  | 380.12  | 16.07  | 0.68  | 4.30  | 0.21  |
| 6  | 13.70   | −2.28  | 0.37  | 0.07  | −0.07 |
| 7  | −541.75 | −30.60 | −1.72 | =5.17 | −0.38 |
| 8  | 295.92  | 26.04  | 2.29  | 3.73  | 0.53  |
| 9  | −28.39  | −6.54  | −1.50 | =2.32 | −0.88 |
| 10 | −17.93  | 4.56   | −1.16 | −2.32 | 0.88  |
| 11 | 255.66  | −23.34 | 2.13  | 3.73  | −0.53 |
| 12 | −491.33 | 28.41  | −1.64 | =5.17 | 0.39  |
| 13 | 17.29   | 2.69   | 0.41  | 0.07  | 0.07  |
| 14 | 352.52  | −15.17 | 0.65  | 4.30  | −0.21 |
| 15 | −229.53 | 12.34  | −0.66 | −3.21 | 0.20  |
| 16 | 38.30   | −4.95  | 0.64  | 2.15  | −0.36 |
| 17 | −33.44  | 4.21   | −0.53 | −2.07 | 0.32  |
| 18 | 128.58  | −6.16  | 0.29  | 2.67  | −0.14 |
| Σ  | 35.09   | 0.42   | −0.00 | 0.33  | 0.00  |

In the lens system of the present invention in which the positive lenses $L_1$ and $L_{10}$ are shifted, they are shifted most outwardly when the magnification is unity. That is, the lens system has the longest length. When the magnification is greater or smaller than unity, both of the lenses $L_1$ and $L_{10}$ move toward the stop. That is, the length of the lens system becomes shorter and the focal length becomes also shorter. Therefore, when a reflecting mirror 4 is interposed in the optical path in order to obtain an erected image, the lens system 3 moves toward the reflecting mirror 4 as shown 3A in FIG. 3 so as to increase the magnification, but the total length of the lens system 3 is decreased as described hereinabove, so that the lens system 3 will not strike the reflecting mirror 4. On the other hand, when the outmost lenses $L_1$ and $L_{10}$ are negative lenses, the total length of the lens system will become shortest when the magnification is unity while the length will become longer when the magnification is larger or smaller than unity, so that, in the optical system of FIG. 3, when the magnification is larger the distance between the lens system 3 and the reflecting mirror 4 tends to become too narrow. That is, the range of magnification change is decreased.

Figure 12:
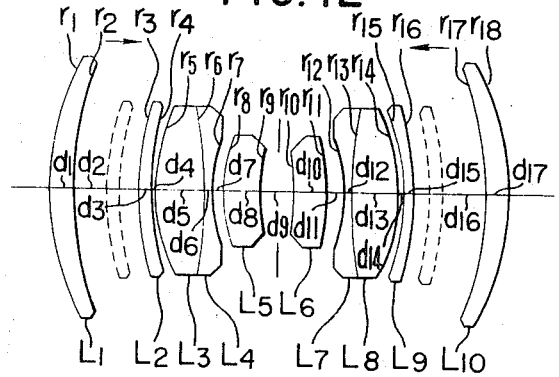
FIG. 12 is a diagrammatic view of the second embodiment of the present invention.
Figure 13:
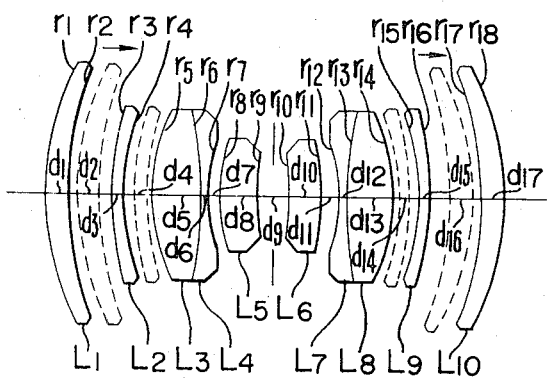
FIG. 13 is a diagrammatic view of the third embodiment of the present invention.

In the instant embodiment, the outermost or front and rear lenses $L_1$ and $L_{10}$ are shifted symmetrically with respect to the stop, but it will be understood that the lenses $L_2$ and $L_9$ may be shifted symmetrically with respect to the stop while the lenses $L_1$ and $L_{10}$ are held stationary as shown in FIG. 12. Alternatively the lenses $L_1$, $L_2$, $L_9$ and $L_{10}$ may be shifted symmetrically with respect to the stop as shown in FIG. 13. In these cases it is preferable that the diameter of the lenses $L_2$ and $L_9$ are made greater. All of the lenses $L_1 - L_{10}$ have been as being completely symmetrical with respect to the stop, but the objects of the present invention may be equally attained when these lenses are arranged nearly symmetrical with respect to the stop.

Figure 14:
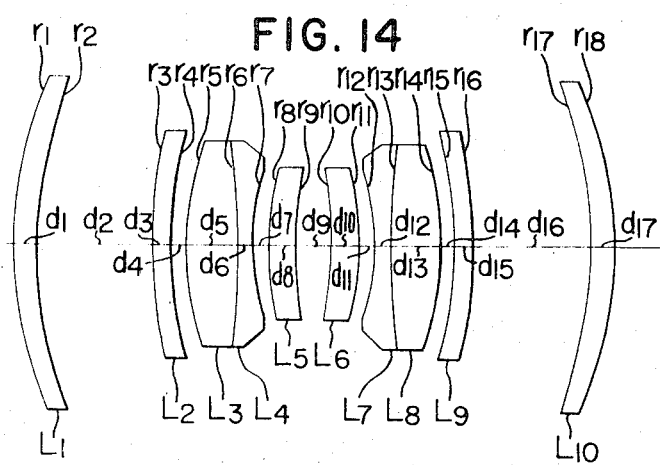
FIG. 14 is a diagrammatic view of the fourth embodiment of the present invention.

FIG. 14 shows the fourth embodiment of the present invention whose design data are given below where $r_n$ = radius of curvature of lens;
$d_n$ = thicknesses of the lenses and the air gaps between them along the optical axis;
$N_n$ = index of refraction of the lens elements when d-line of helium if used; and
$V_n$ = Abbe numbers of the lens elements when d-line of helium is used.
($n$ is numbered from front to rear.)

The maximum aperture ratio = 1 : 11
Focal length = 248 mm – 258 mm
Magnification = 0.7 – 1.4

| | | | |
|---|---|---|---|
| $r_1$=67.1 | $d_1$=4.63 | | |
| $r_2$=75.254 | $d_2$=1.72—20.585 | $N_1$ = 1.54625 | $V_1$ = 59.7 |
| $r_3$ = 85.9 | $d_3$ = 3.45 | | |
| $r_4$ = 69.173 | $d_4$ = 2.41 | $N_2$ = 1.53933 | $V_2$ = 48.9 |
| $r_5$ = 53.785 | $d_5$ = 8.94 | | |
| $r_6$ = –144.61 | $d_6$ = 2.63 | $N_3$ = 1.68641 | $V_3$ = 55.5 |
| $r_7$ = 42.326 | $d_7$ = 2.90 | $N_4$ = 1.63306 | $V_4$ = 47.0 |
| $r_8$ = 59.235 | $d_8$ = 5.29 | | |
| $r_9$ = 88.855 | $d_9$ = 6.62 | $N_5$ = 1.61725 | $V_5$ = 46.2 |
| $r_{10}$=–88.855 | $d_{10}$= 5.29 | | $V_6$ = 46.2 |
| $r_{11}$=–59.259 | $d_{11}$= 2.90 | $N_6$ = 1.61725 | |
| $r_{12}$=–42.326 | $d_{12}$= 2.63 | | $V_7$ = 47.0 |
| $r_{13}$=144.61 | $d_{13}$= 8.94 | $N_7$ = 1.63306 | $V_8$ = 55.5 |
| $r_{14}$=–53.785 | $d_{14}$= 2.41 | $N_8$ = 1.68641 | |
| $r_{15}$=–69.173 | $d_{15}$= 3.45 | | $V_9$ = 48.9 |
| $r_{16}$=–85.9 | $d_{16}$= 1.71—20.585 | $N_9$ = 1.53933 | |
| $r_{17}$=–75.254 | $d_{17}$= 4.36 | | $V_{10}$= 59.7 |
| $r_{18}$ =–67.1 | | $N_{10}$= 1.54625 | |

Figure 15:
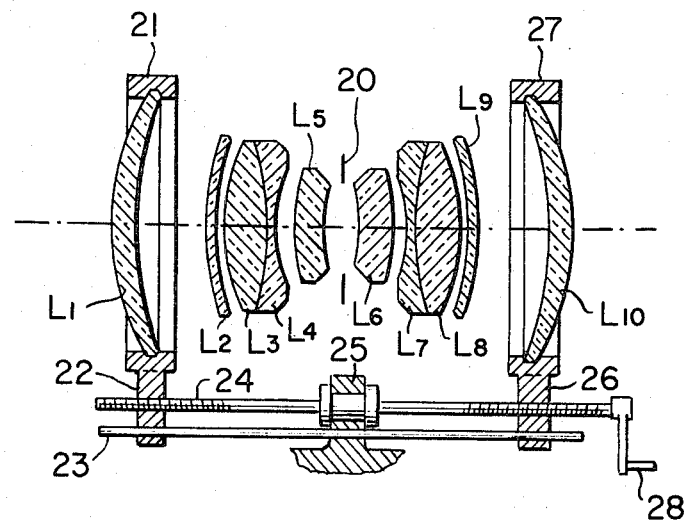
FIG. 15 is an elevational view showing mechanical apparatus for simultaneously moving two symmetrical lens elements in opposite directions with respect to the central stop.

FIG. 15 shows the lens assembly of FIG. 1, with the two outermost lenses $L_1$ and $L_{10}$ mounted for simultaneous movement in opposite directions while maintaining their positions symmetrical with respect to the stop at center line 20 of the lens assembly.

Lens element $L_1$ is mounted in a ring 21 supported on a carriage 22 which is movable along one or more guides 23 by means of a lead screw 24. The lead screw 24 is journalled at its center in a fixed support 25. The other end of the lead screw threadedly engages a carriage 26 supporting a ring 27 which encircles the lens element $L_{10}$. The two ends of the lead screw 24 are oppositely threaded, i.e. one has a left hand thread and the other a right hand thread. One end of the lead screw is provided with a crank 28 by means of which it may be rotated.

It may be seen that rotation of the crank 28 drives the lens element $L_1$ in one direction. Thus the two lens element $L_{10}$ in the opposite direction. Thus the two lens elements $L_1$ and $L_{10}$ maintain their symmetrical positions with respect to the stop or center line 20, throughout their range of movement.

It should be understood that the mechanism for moving the lens elements $L_1$ and $L_{10}$ simultaneously at equal speeds in opposite directions may take various forms other than the simple form shown in FIG. 15 by way of example.

A similar mechanism may be used to move the lens elements $L_2$ and $L_9$, as in the lens assembly of FIG. 12. Alternatively, the lens elements $L_1$ and $L_2$ could be moved together and the lens elements $L_9$ and $L_{10}$ could be moved together, as in FIG. 13.

What is claimed is:

1. A variable-magnifying-power lens system between stationary object and image planes and whose magnification may be continuously varied within a range near unity magnification comprising a plurality of lens elements arranged symmetrically with respect to a central stop in such a manner that at least one of the outermost lens elements on each side of the central stop may be shifted while maintaining the symmetry of all lens elements with respect to said central stop, and in which the lens system may be shifted as a unit to compensate for changes in focal lengths brought about by shifting of said lens elements.

2. A lens system according to claim 1, in which the outermost lens elements may be shifted.

3. A lens system according to claim 1, in which the next-to-the-outermost lens elements may be shifted.

4. A lens system according to claim 1, in which the outermost and the next-to-the-outermost lens elements may be shifted.

5. A variable-magnifying-power lens system according to claim 1, in which the focal length of each of the two outermost lens elements of the system are between about two and five times the compound focal length of the lens system.

6. A lens system according to claim 5, in which said two outermost lens elements are meniscus lenses whose concave surfaces are directed toward said central stop.

7. A lens system according to claim 6, in which there are ten lens elements in said system which are numbered consecutively from front to rear, those of the lens elements having concave surfaces are positioned so that such surfaces are directed toward the central stop.

8. A variable-magnifying-power lens system whose magnification may be continuously varied within a range near the unity magnification comprising 10 lens elements arranged symmetrical with respect to a center stop and numbered consecutively from front to rear, the first and tenth lenses being the positive meniscus lenses which are shifted toward and away from said center stop while maintaining said symmetry with respect to said center stop, the second and ninth lenses being the negative meniscus lenses, the third and fourth lenses and the seventh and eighth lenses being biconvex and biconcave lenses respectively cemented together, the fifth and sixth lenses being the positive meniscus lenses, the concave surfaces of all of said lenses and cemented lenses being directed toward to said center stop, the individual lenses having the following radii of curvature of the surfaces, the thicknesses and distance along the optical axis of lenses and air spaces, the indexes of refraction and Abbe numbers when d-line of helium is used with the maximum aperture ratio of 1 : 8, the focal between 240 mg and 258 mm and the magnification range between 0.7 and 1.4;

| | | | |
|---|---|---|---|
| $r_1 = 78.65$ | $d_1 = 6.58$ | $N_1\ 32\ 1.53996$ | $V_1 = 59.7$ |
| $r_2 = 101.29$ | $d_2 = 4.8-21.4$ | | |
| $r_3 = 96.68$ | $d_3 = 3.29$ | $N_2 = 1.53172$ | $V_2 = 48.9$ |
| $r_4 = 64.89$ | $d_4 = 1.48$ | | |
| $r_5 = 56.40$ | $d_5 = 12.77$ | $N_3 = 1.67790$ | $V_3 = 55.5$ |
| $r_6 = -150.04$ | $D_6 = 2.38$ | $N_4 = 1.62374$ | $V_4 = 47.0$ |
| $r_7 = 44.58$ | $D_7 = 4.19$ | | |
| $r_8 = 59.50$ | $d_8 = 10.43$ | $N_5 = 1.58900$ | $V_5 = 48.6$ |
| $r_9 = 95.76$ | $d_9 = 8.43$ | | |
| $r_{10} = -95.76$ | $d_{10} = 10.43$ | $N_6 = 1.58900$ | $V_6 = 48.6$ |
| $r_{11} = -59.50$ | $d_{11} = 4.19$ | | |
| $r_{12} = -44.58$ | $d_{12} = 2.38$ | $N_7 = 1.62374$ | $V_7 = 47.0$ |
| $r_{13} = 150.04$ | $d_{13} = 12.77$ | $N_8 = 1.67790$ | $V_8 = 55.5$ |
| $r_{14} = -56.40$ | $d_{14} = 1.48$ | | |
| $r_{15} = -64.89$ | $d_{15} = 3.29$ | $N_9 = 1.53172$ | $V_9 = 48.9$ |
| $r_{16} = -96.68$ | $d_{16} = 4.8-21.4$ | | |
| $r_{17} = -101.19$ | $d_{17} = 6.58$ | $N_{10} = 1.53996$ | $V_{10} = 59.7$ |
| $r_{18} = -78.65$ | | | | where $x$ with a numerical subscript indicates the radius of curvature of a surface identified by the subscript, numbering the surfaces consecutively from front to rear, a plus radius indicates a surface convex toward the front while a minus radius indicates a surface concave toward the front, $d$ with a numerical subscript indicates the thickness of the individual lens and the air space between the adjacent lenses numbering from front to rear, N with a subscript indicates the index of refraction of the lens identified by the subscript and V with a subscript indicates the Abbe number of the lens identified by the subscript.

9. A variable-magnifying-power lens system whose magnification may be continuously varied within a range near the unity magnification comprising
10 lens elements arranged symmetrical with respect to a center stop and numbered consecutively from front to rear,
the first and tenth lenses being the positive meniscus lenses which are shifted toward and away from said center stop while maintaining said symmetry with respect to said center atop,
the second and ninth lenses being the negative meniscus lenses,
the third and fourth lenses and the seventh and eighth lenses being biconvex and biconcave lenses respectively cemented together,
the fifth and sixth lenses being the positive meniscus lenses,
the concave surfaces of all of said lenses and cemented lenses being directed toward to said center stop.

the individual lenses having the following radii of curvature of the surfaces, the thicknesses and distance along the optical axis of lenses and air spaces, the indexes of refraction and Abbe numbers when $d$-line of helium is used with the maximum aperture ratio of 1 : 11, the focal length between 248 mm and 258 mm and the magnification range between 0.7 and 1.4 ;

| | | |
|---|---|---|
| $r_1 - 67.1$ | $d_1 = 4.63$ | |
| $r_2 = 75.254$ | $d_2 = 1.71-20.585$ | $N_1 = 1.54625$ |
| | $V_1 = 59.7$ | |
| $r_3 = 85.9$ | $d_3 = 3.45$ | |
| $r_4 = 69.173$ | $d_4 = 2.41$ | $N_2 = 1.53993$ |
| | $V_2 = 48.9$ | |
| $r_5 = 53.785$ | $d_5 = 8.94$ | |
| $r_6 = -144.61$ | $d_6 = 2.63$ | $N_3 = 1.68641$ |
| | $V_3 = 55.5$ | |
| $r_7 = 42.326$ | $d_7 = 2.90$ | $N_4 = 1.63306$ |
| | $V_4 = 47.0$ | |
| $r_8 = 59.235$ | $d_8 = 5.29$ | |
| $r_9 = 88.855$ | $d_9 = 6.62$ | $N_5 = 1.61725$ |
| | $V_5 = 46.2$ | |
| $r_{10} = -88.855$ | $d_{10} = 5.29$ | |
| | $V_6 = 46.2$ | |
| $r_{11} = -59.259$ | $d_{11} = 2.90$ | $N_6 = 1.61725$ |
| $r_{12} = -42.326$ | $d_{12} = 2.63$ | |
| | $V_7 = 47.0$ | |
| $r_{13} = 144.61$ | $d_{13} = 8.94$ | $N_7 = 1.63306$ |
| | $V_8 = 55.5$ | |
| $r_{14} = -53.785$ | $d_{14} = 2.41$ | $N_8 = 1.68641$ |
| $r_{15} = -69.173$ | $d_{15} = 3.45$ | |
| | $V_9 = 48.9$ | |
| $r_{16} = -85.9$ | $d_{16} = 1.71-20.585$ | $N_9 = 1.53933$ |
| $r_{17} = -75.254$ | $d_{17} = 4.36$ | |
| | $V_{10} = 59.7$ | |
| $r_{18} = -67.1$ | | $N_{10} = 1.54625$ | where $r$ with a numerical subscript indicates the radius of curvature of a surface identified by the subscript, numbering the surfaces consecutively from front to rear, a plus radius indicates a surface convex toward the front while a minus radius indicates a surface concave toward the front, $d$ with a numerical subscript indicates the thickness of the individual lens and the air space between the adjacent lenses numbering from front to rear, N with a subscript indicates the index of refraction of the lens identified by the subscript and V with a subscript indicates the Abbe number of the lens identified by the subscript.

* * * * *